Nov. 4, 1952           H. R. MALM           2,616,292
VALVE SPRING TESTER
Filed March 12, 1948           2 SHEETS—SHEET 1
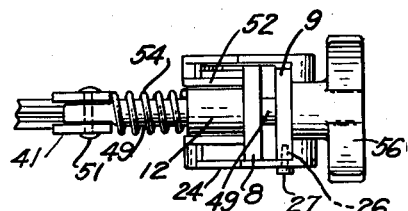
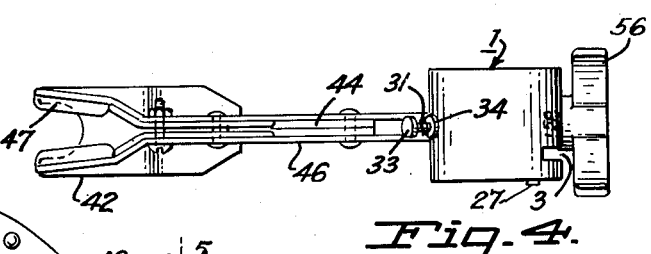
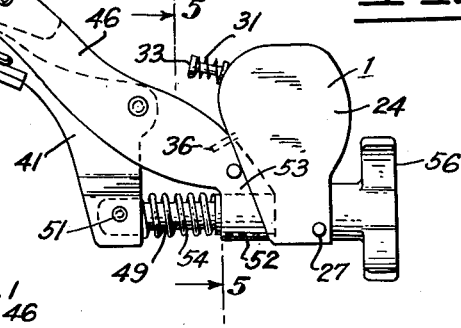
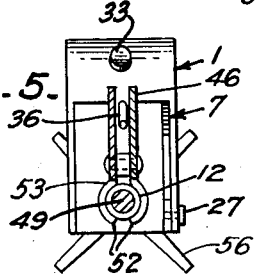
INVENTOR.
HOWARD R. MALM
BY George B White
ATTORNEY Nov. 4, 1952 — H. R. MALM — 2,616,292
VALVE SPRING TESTER
Filed March 12, 1948 — 2 SHEETS—SHEET 2
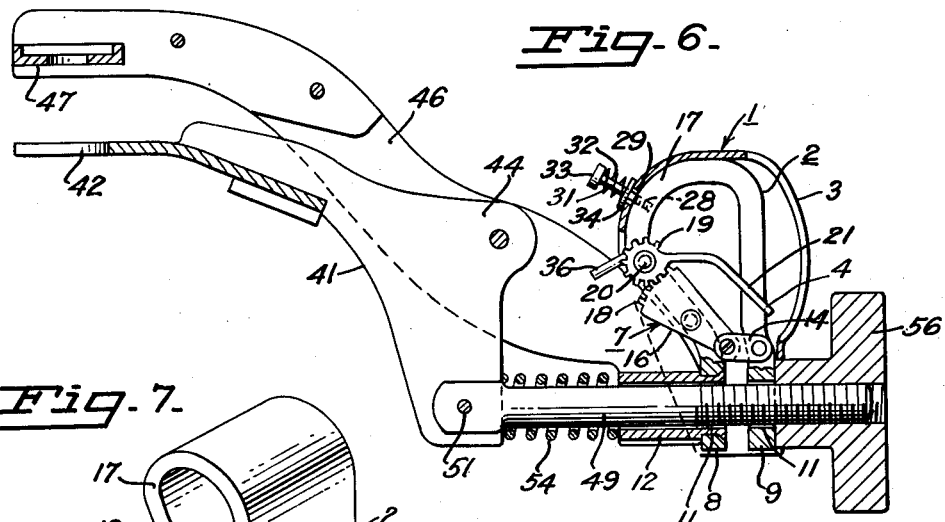
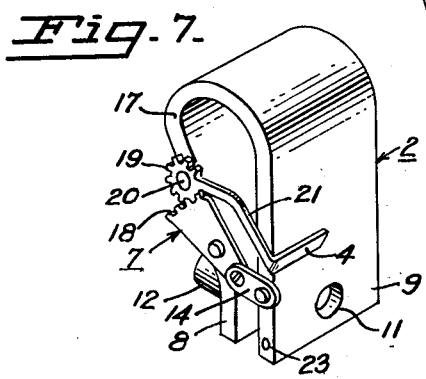
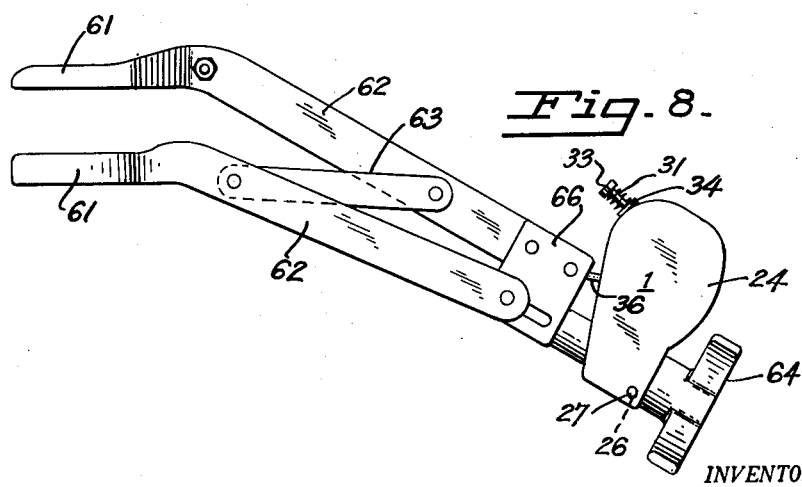
INVENTOR.
HOWARD R. MALM
BY George B. White
ATTORNEY Patented Nov. 4, 1952

2,616,292

UNITED STATES PATENT OFFICE 2,616,292

VALVE SPRING TESTER

Howard R. Malm, San Francisco, Calif.

Application March 12, 1948, Serial No. 14,435

10 Claims. (Cl. 73—161)

This invention relates to a valve spring tester.

The primary object of this invention is to provide a valve spring tester which is adapted to co-act with valve lifter elements for lifting the valve and giving a reading of spring resistance to such lifting and thereby determining the strength and condition of a valve spring.

Another object of this invention is the provision of a valve spring tester adapted to be attached to a valve lifter, for measuring and indicating the tension of the valve spring.

Another object of this invention is to provide a device which can be easily applied to valve parts for testing the valve spring.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of my device on a valve lifter.

Fig. 2 is a fragmental bottom plan view of my device on a valve lifter.

Fig. 3 is partly sectional, showing my device in operation on a valve and valve spring.

Fig. 4 is a top plan view of the device.

Fig. 5 is a sectional view, the section being taken on the lines 5—5 of Fig. 4.

Fig. 6 is a somewhat enlarged sectional view of my device on a valve lifter.

Fig. 7 is a perspective view of the inside operating mechanism of my device.

Fig. 8 is a side view of my device on another type of valve lifter.

My device for valve spring testing includes a casing 1 which fits over a bow spring 2 and has a slot 3 on its face, through which latter an indicator finger 4 can be observed so as to give a reading on graduations 6 along said slot 3, indicating valve spring tension according to the force exerted on said bow spring 2. A translating device 7 on the bow spring 2 moves the indicator finger 4 in proportion to the compression of said bow spring 2.

The bow spring 2 is of substantial strength and its ends 8 and 9 are elongated into generally parallel flanges. The flange ends 8 and 9 have aligned holes 11 therethrough. A tube 12 has on it a reduced end, which is riveted in the hole 11 of the flange 8. This hole 11 in flange 9 is the same inside diameter as that of the tube 12. The tube 12 extends outwardly from the bow spring 2 and substantially within the plane of the bow spring 2.

The translator device 7 includes a link 14 pivoted at one end thereof to the bow spring at about the base of the plain flange end 9. A lever 16 is pivoted on the side of the bow 17 of the bow spring 2 spaced from the other flange 8. An end of the lever 16 is pivoted to said link 14. On the other end of the lever 16 is formed a sector gear 18. A pinion 19 is journalled on a shaft 20 on the same side of the bow spring 2 and is in mesh with the sector gear 18. An arm 21 extends from the pinion 19 across the entire side of both branches of the bow spring 2 and the indicator finger 4 is on the end of the arm 21 bent at right angles so that the finger 4 is parallel with the outside face of the bow spring 2.

When the flanges 8 and 9 are pressed together or released, the link 14 turns the lever 16, which latter in turn through the sector gear 18 rotates the pinion 19 and moves the arm 21 and the indicator finger 4 in respective directions. The indicating graduations 6 on the outer casing 1 are calibrated to indicate the spring tension required for certain shifting of the bow spring flanges 8 and 9 toward one another.

The casing 1 covers all sides of the bow spring 2, except the tips of the flange 8 and 9 and part of the underside of the bow 17 of the bow spring 2. In one side of the plain flange 9 is a socket hole 23, as shown in Fig. 7. The side 24 of the casing 1 has a hole 26 therethrough aligned with said socket hole 23, to accommodate a pin 27 therein, which holds said casing 1 and bow spring 2 together. The top of the bow 17 of the bow spring 2 has a socket hole 28 therein aligned with a hole 29 in the adjacent portion of the casing 1, to accommodate a pin 31 suitably secured therein. A coil spring 32 around this pin 31 bears against the head 33 of the pin 31 at one end thereof, and against a washer 34 on the casing 1 at its other end, for exerting an outward pull on the bow 17 of the bow spring 2 and hold it against the casing 1. When the bow spring flanges 8 and 9 are pressed together, the side pin 27 holds the plain flange 9 stationary with respect to the casing 1, but the other or bushing flange 8 is moved, and pulls with it the spring bow 17 inwardly of the casing 1. The coil spring 32 allows the case 1 to follow the bow 17. A locating pin 36 extends from the outer face of the spring bow 17 near the location of the pinion 19, but centered on said face, for engagement with certain valve lifters and holding the device against sidewise displacement.

In operation this testing device is adapted to lift a usual valve stem against the action of the valve spring and to transmit the lifting force thus exerted to the compression of the bow spring 2 of the device. In the illustrative embodiment shown in Figures 1 to 6 inclusive, my device is shown in connection with a valve lifter of a widely used type. This valve lifter has a lower arm 41 with a fork end 42 adapted to rest on the valve plunger 43 as shown on Fig. 3. On an ear 44 of said arm 41 is pivoted a valve lift lever 46, of substantially channel cross section, a forked seat 47 on the free end of the lever 46 is adapted to engage the bottom of a valve spring seat 48. A bolt 49 is pivoted to the inner end 51 of the arm 41, and extends through a sleeve 52 in the opposite end 53 of the lever 46. A coil spring 54 around said bolt 49 and between said arm end 51 and sleeve 52, normally urges the said inner ends apart so as to hold the forked ends 42 and 47 together. On the threaded end of the bolt 49 is a hand wheel 56 the hub of which can engage the lever end 53 to push it toward the arm end 51 for exerting the valve lifting force. The bolt 49 is extended through the flange tube 12 and the flange hole 11 of the bow spring 2 of my device, and the tube 12 is inserted into the lever sleeve 52. Then by turning the hand wheel 56 against the outer bow spring flange 9 the end flanges are pressed together in proportion to the force required to push the lever end 53 toward the arm end 51 on the smooth portion of the bolt 49 for lifting a valve 57 and compressing the valve spring 58, as shown in Fig. 3, the corresponding shifting of the indicator finger along the slot 3 indicates on the calibrated scale of graduations 6 the critical tension or quality of the valve spring 58, for which it is tested.

In the modified form shown in Fig. 8, my device is applied to a slightly different type of known valve lifter. In this form the jaws 61 on the levers 62 are moved apart or together by shifting the upper and lower arm longitudinally and around a brace link 63 pivoted at its ends to the opposite levers. My device is fitted between the usual hand lever 64 and the lever head 66, and over the bolt, not shown, and registers the tension required to lift a valve spring, as heretofore described.

I claim:

1. A valve spring tester of the character described, comprising a casing, a bow spring within the casing, one end of said bow spring being anchored to said casing, a device to transmit to the other end of the bow spring a reaction force generated by the lifting of a valve spring, an indicator device connected to the bow spring for indicating the relative bowing of said bow spring under said reaction force, and a calibrated scale on the casing coacting with said indicator device to convert the bowing of the bow spring into a reading of a critical valve spring characteristic.

2. A valve spring tester comprising a casing, a bow spring in the casing, the ends of the bow spring being adjacent, one of said ends being secured to said casing, an element on the other end of said bow spring for connection to a valve lifter device, a manipulating device coacting with said other end of said bow spring and said element for compressing said ends when a valve is lifted, an indicator device responsive to the relative changes in the bow of said bow spring, and a calibrated element coacting with said indicator device for a reading of valve spring tension according to the lifting force exerted through said bow spring.

3. In a valve spring tester, a spring bow, ends of the spring bow being opposite and one of said ends being secured to said casing, an element on the other end of said bow spring for connection to a valve lifting device, a manipulating device connected to the valve lifting device and coacting with the said other end of the bow spring to press said ends toward one another by the force applied for lifting a valve, an indicator device on said spring bow for indicating the extent of compression of said spring bow by said force, and a calibrated element coacting with said indicator device for a reading of valve spring tension.

4. In a valve spring tester, a casing, a spring bow in the casing, ends of the spring bow being opposite and generally parallel with one another and one of said ends being secured to said casing, means to connect said ends with a valve lifter so that the force for lifting a valve also presses said ends together, an indicator device on said spring bow responsive to the relative movement of said ends, and means to convert the movement of said indicator device into a reading of valve spring tension.

5. In a valve spring tester, a spring bow, ends of the spring bow being opposite to one another, said ends having aligned passages therethrough, a device for exerting lifting force on a valve lifter extended through said passages and engaging said ends to press said ends together when force is applied for valve lifting, an indicator device on said spring bow actuated by the relative movement of said ends, and a calibrated element coacting with said indicator device for a reading of valve spring tension.

6. In a valve spring tester, a casing, a spring bow in the casing, ends of the spring bow being opposite one another and one of said ends being anchored to said casing, an element on one of said ends connectable to a valve lifting device, a manipulating device connectable to a valve lifting device and coacting with said ends to press said ends together by a force applied for valve lifting, an indicator device connected to the branches of said spring bow to indicate the relative movement of said ends, and a calibrated scale on said casing coacting with said indicator device for a reading of valve spring tension corresponding to the relative bow spring compression.

7. The combination with the arms of a valve lifting device and a mechanism to apply valve lifting force to said arms; of a valve spring tester, comprising a casing, a spring bow in the casing, ends of the spring bow interconnected between said mechanism and said arms to be pressed together when said valve lifting force is applied, one of said ends being secured to said casing, an indicator device connected to the spring bow to indicate the extent of relative movement of said ends, and a calibrated scale on said casing held stationary relatively to said secured end to coact with said indicator device for a reading of the tension of the valve spring compressed by said valve lifter device.

8. The combination with the arms of a valve lifting device and mechanism to apply valve lifting force to said arms including a pulling element mounted on one arm and movable relatively to the other arm; of a valve spring tester, comprising, a spring bow, ends of the spring bow being opposite and having passages therein to receive said pulling element so that valve lifting pressure is applied through pressure upon said ends, an indicator device on said spring bow for indicating the relative movement of said spring bow ends, and a calibrated element held stationary relatively to one of said ends and coacting with said indicating device for reading of valve spring tension corresponding to said relative movement.

9. The combination with the lifting arms of a valve lifting device, and a bolt and handwheel on the bolt for pressing said arms together for lifting a valve; of a valve spring tester, comprising, a spring bow, ends of the bow spring being opposite and having passages therethrough for said bolt and between one of said arms and said handwheel and being pressed together by said handwheel in proportion to the force applied for lifting the valve, an indicator device on the spring bow indicating the relative movement of said ends when pressed together, and a calibrated element co-acting with said indicator device for a reading of valve spring tension corresponding to said relative movement.

10. The combination with the fulcrumed lifting arms of a valve lifting device and a bolt pivoted on one arm and slidable through the other arm and a handwheel on the free end of the bolt for exerting valve lifting force on said arms; of a valve tester comprising, a spring bow, ends of said spring bow being opposite one another and having passages therethrough, said bolt extending through said passages between one of said arms and said handwheel so that said ends are pressed together by said handwheel when valve lifting force is applied to said arms; an indicating device on the spring bow to indicate the relative movement of said spring bow ends under pressure, and a calibrated element coacting with said indicator device for a reading of valve spring tension corresponding to said relative movement.

HOWARD R. MALM.

REFERENCES CITED

The following references are of record in the file of this patent:

UNITED STATES PATENTS

| Number | Name | Date |
| --- | --- | --- |
| 1,001,666 | McGuire | Aug. 29, 1911 |
| 2,066,585 | Sunnen | Jan. 5, 1937 |